(12) United States Patent
Schubert et al.

(10) Patent No.: US 11,146,331 B1
(45) Date of Patent: *Oct. 12, 2021

(54) FREE-SPACE OPTICAL COMMUNICATIONS NETWORK

(71) Applicant: X Development LLC, Mountain View, CA (US)

(72) Inventors: Martin Schubert, Mountain View, CA (US); Sylvia Smullin, Menlo Park, CA (US); Edward Allen Keyes, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,412

(22) Filed: Jul. 22, 2020

Related U.S. Application Data

(63) Continuation of application No. 16/257,677, filed on Jan. 25, 2019, now Pat. No. 10,763,960, which is a continuation of application No. 15/647,835, filed on Jul. 12, 2017, now Pat. No. 10,225,011.

(60) Provisional application No. 62/481,915, filed on Apr. 5, 2017.

(51) Int. Cl.
*H04B 10/112* (2013.01)
*H04B 10/118* (2013.01)
*H04Q 11/00* (2006.01)

(52) U.S. Cl.
CPC ..... *H04B 10/1125* (2013.01); *H04B 10/1121* (2013.01); *H04B 10/1127* (2013.01); *H04Q 11/0067* (2013.01); *H04Q 2011/0026* (2013.01)

(58) Field of Classification Search
CPC .......................................... H04B 10/112–1129
See application file for complete search history.

(56) References Cited

U.S. PATENT DOCUMENTS

| 6,462,847 | B2 | 10/2002 | Willebrand |
| 6,490,067 | B2 | 12/2002 | Bloom et al. |
| 6,522,865 | B1 * | 2/2003 | Otten ................... H04B 7/1858 455/13.1 |
| 7,106,973 | B2 | 9/2006 | Kube et al. |
| 8,155,520 | B1 * | 4/2012 | West .................. H04Q 11/0066 398/50 |

(Continued)

OTHER PUBLICATIONS

Farrel, et al., "A Path Computation Element (PCE)-Based Architecture", Memo, The Internet Society, Aug. 2006, pp. 1-40.

*Primary Examiner* — Shi K Li
(74) *Attorney, Agent, or Firm* — Botos Churchill IP Law

(57) ABSTRACT

The disclosure provides for a system that includes a plurality of stations equipped for free-space optical communications (FSOC) in a network and a central control system. At least one station in the plurality of stations includes a wavelength selectable switch, an OEO module, and one or more first processors. The one or more first processors are configured to control the wavelength selectable switch, process an electrical signal that is extracted using the OEO module, and communicate with the central control system. The central control system includes one or more second processors that are configured to receive data regarding FSOC communication conditions at the plurality of stations, determine a path between stations through the network based on the received data, and transmit instructions to the plurality of stations.

20 Claims, 11 Drawing Sheets

(56) References Cited

U.S. PATENT DOCUMENTS

| | | | |
|---|---|---|---|
| 8,194,569 B2 | 6/2012 | Shorty et al. | |
| 9,270,372 B2 | 2/2016 | Miniscalco | |
| 9,379,815 B2 | 6/2016 | Coleman et al. | |
| 10,225,011 B1 | 3/2019 | Schubert et al. | |
| 2003/0123880 A1* | 7/2003 | Boertjes | H04J 14/02 398/83 |
| 2012/0063773 A1 | 3/2012 | Sluz et al. | |
| 2013/0179008 A1* | 7/2013 | DeVaul | H04B 10/118 701/3 |
| 2013/0251367 A1 | 9/2013 | Ishii et al. | |
| 2014/0014770 A1 | 1/2014 | Teller et al. | |
| 2014/0341568 A1* | 11/2014 | Zhang | H04J 14/0212 398/34 |
| 2015/0125141 A1* | 5/2015 | Hu | H04B 10/0793 398/5 |
| 2016/0261933 A1* | 9/2016 | Jenkins | H04J 14/0217 |
| 2016/0373188 A1 | 12/2016 | Lambert | |

* cited by examiner

800

1

FREE-SPACE OPTICAL COMMUNICATIONS NETWORK

CROSS-REFERENCE TO RELATED APPLICATIONS

The present application is a continuation of U.S. patent application Ser. No. 16/257,677, filed Jan. 25, 2019, which is a continuation of U.S. patent application Ser. No. 15/647,835, filed Jul. 12, 2017, which claims the benefit of the filing date of U.S. Provisional Patent Application No. 62/481,915, filed Apr. 5, 2017, the disclosure of which is incorporated herein by reference.

BACKGROUND

Information can be transmitted over directional point-to-point networks, such as aerospace and other mobile networks. In such networks, links can be formed between pairs of nodes, or terminals at each node, by aiming lens systems of each node pair towards each other. In some implementations, the nodes may transmit and receive optical signals through free space optical communication (FSOC) links.

BRIEF SUMMARY

Aspects of the disclosure provide for a system that includes a plurality of stations equipped for FSOC in a network and a central control system. A first station in the plurality of stations includes a wavelength selectable switch configured to perform optical circuit switching (OCS) in the network, an optical-electrical-optical (OEO) module, and one or more first processors. The one or more first processors are configured to receive instructions from the central control system, control the wavelength selectable switch according to the received instructions, transmit a first data to the central control system regarding FSOC communication conditions at the first station, and process an electrical signal, the electrical signal being extracted, using the OEO module, from an optical signal received from or for transmission to a source or a destination station. The central control system includes one or more second processors that are configured to receive the first data regarding FSOC communication conditions at the first station, determine a path between a given source station of the plurality of stations and a given destination station of the plurality of stations through the network based on the first data, the path including the first station being designated for OEO, generate the instructions based on the path, and transmit, to the plurality of stations, the instructions.

In some embodiments, the instructions comprise a pointing direction for the first station and a port assignment for the wavelength selectable switch. In some implementations, the first data includes weather data and forecasts at locations of the plurality of stations or predicted or measured duration and characteristics of fades at each of the plurality of stations. The central control system is optionally remote from the plurality of stations. In other implementations, the one or more first processors are configured to process the electrical signal by performing an error/fade detection and correction protocol.

Additionally or alternatively, a first subset of the plurality of stations are high-altitude platform (HAP) stations and a second subset of the plurality of stations are ground stations. In this example, the first station is a HAP station, and the given source and destination stations are ground stations. The one or more second processors are also configured to designate one or more HAP stations linked with ground stations according to the determined path to perform OEO. The wavelength selectable switch is optionally configured to receive a first signal having a first wavelength and a second signal having the first wavelength, and transmit a combination of the first signal and the second signal through a first output port. In addition, the wavelength selectable switch optionally includes a fiber spool configured to combine the first signal and the second signal by aligning a portion of the first signal and a portion of the second signal with corresponding time division multiple access (TDMA) frames.

Other aspects of the disclosure provide for a method for controlling a plurality of stations in a network. The method includes receiving, by one or more processors, a first data regarding free-space optical communications (FSOC) conditions in the network, the network including the plurality of stations configured for FSOC; determining, by the one or more processors, a path between a first station of the plurality of stations and a second station of the plurality of stations through the network based on the first data, the path including a first station designated for optical-electrical-optical conversion (OEO) and a second station designated for optical circuit switching (OCS); designating, by the one or more processors, a first wavelength of light for the determined path; and transmitting, by the one or more processors, to the plurality of stations, instructions for implementing the determined path for the first wavelength of light.

In some embodiments, the first data includes one or more of available system resources and demand at each of the plurality of stations, weather data and forecasts at locations of the plurality of stations, or predicted or measured duration and characteristics of fades at each of the plurality of stations. Optionally, the one or more processors are in a central control system is remote from the plurality of stations. In certain implementations, the plurality of stations includes a first subset of ground stations and a second subset of HAP stations. The method in these implementations also optionally includes designating HAP stations of the second subset linked with ground stations of the first subset according to the determined path to perform OEO.

In other embodiments, the method includes receiving, by the one or more processors, a second data from a remote system, the second data being related to conditions between the plurality of stations or at the plurality of stations. The path in these embodiments is determined based on the first data and the second data. Optionally, the method also includes receiving, by the one or more processors, a client request to transmit data from the first station to the second station; and sending, by the one or more processors, instructions to the first station regarding transmitting the data along the path in response to the client request.

Further aspects of the disclosure provide for a method performed at a station. The method includes receiving, by one or more processors of a first station in a network, instructions related to implementation of a predetermined path across the network from a central control system, the received instructions including an assignment of a first wavelength to the predetermined path and a designation of the first station for performing optical-electrical-optical conversion (OEO); causing, by the one or more processors, a lens system of the first station to move to a set pointing direction in accordance with the received instructions; receiving, by the one or more processors, an optical signal carrying data from a second station; converting, by the one or more processors, the data from the optical signal to an electrical signal using an OEO module; converting, by the one or more processors, the electric signal to an output optical signal having the first wavelength according to the received instructions; and transmitting, by the one or more processors, the output optical signal to a next station in the predetermined path.

In some embodiments, this method also includes processing, by the one or more processors, the electrical signal by performing error/fade detection and correction. The method also optionally includes transmitting, by the one or more processors, a first data to a central control system regarding FSOC communication conditions at the first station; receiving, by the one or more processors, instructions from the central control system; and controlling, by the one or more processors, a wavelength selectable switch of the first station according to the received instructions.

DETAILED DESCRIPTION

Overview

Figure 1A:
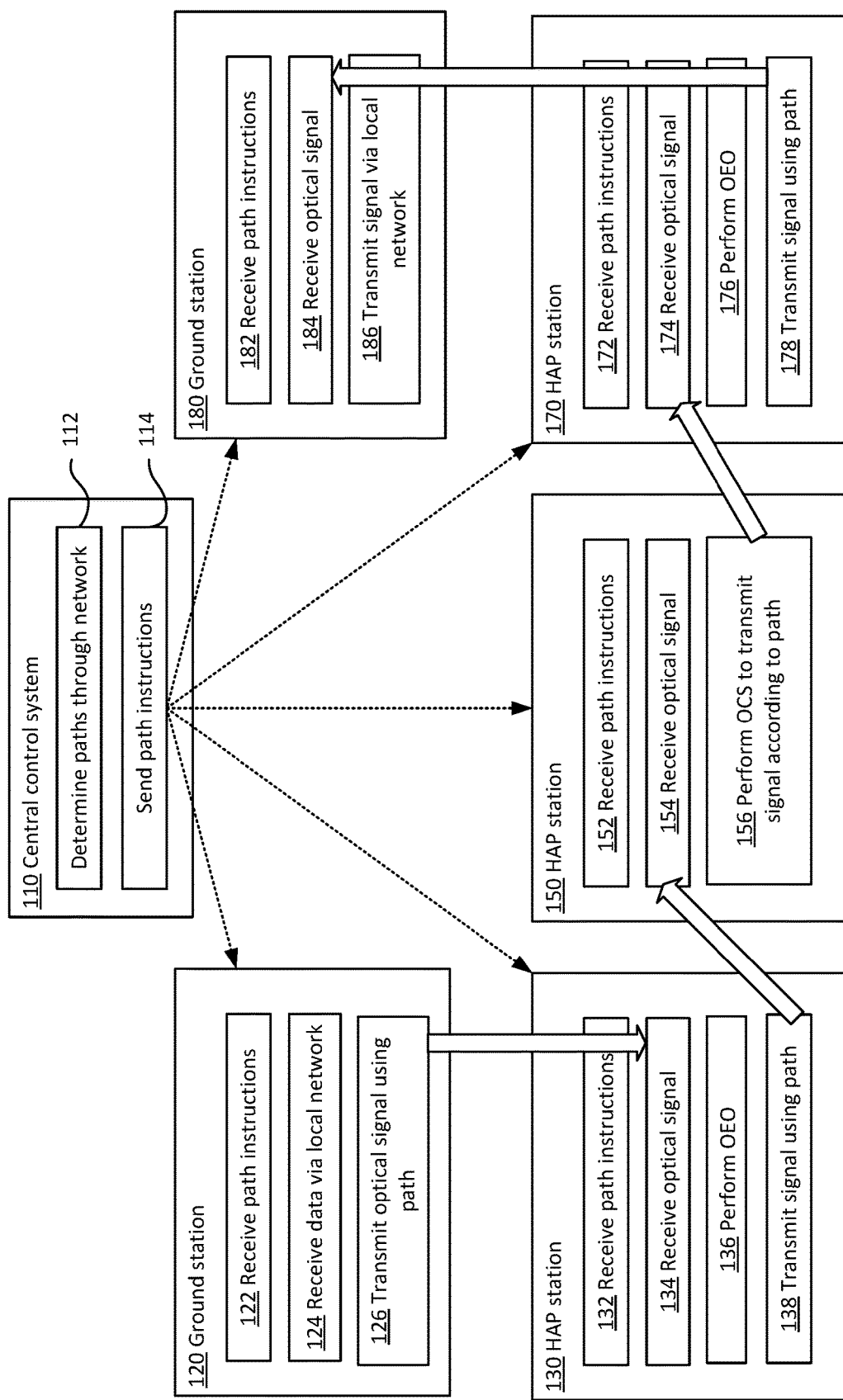
FIG. 1A is a functional flow diagram of an example directional point-to-point network 100 in accordance with aspects of the disclosure.
Figure 1B:
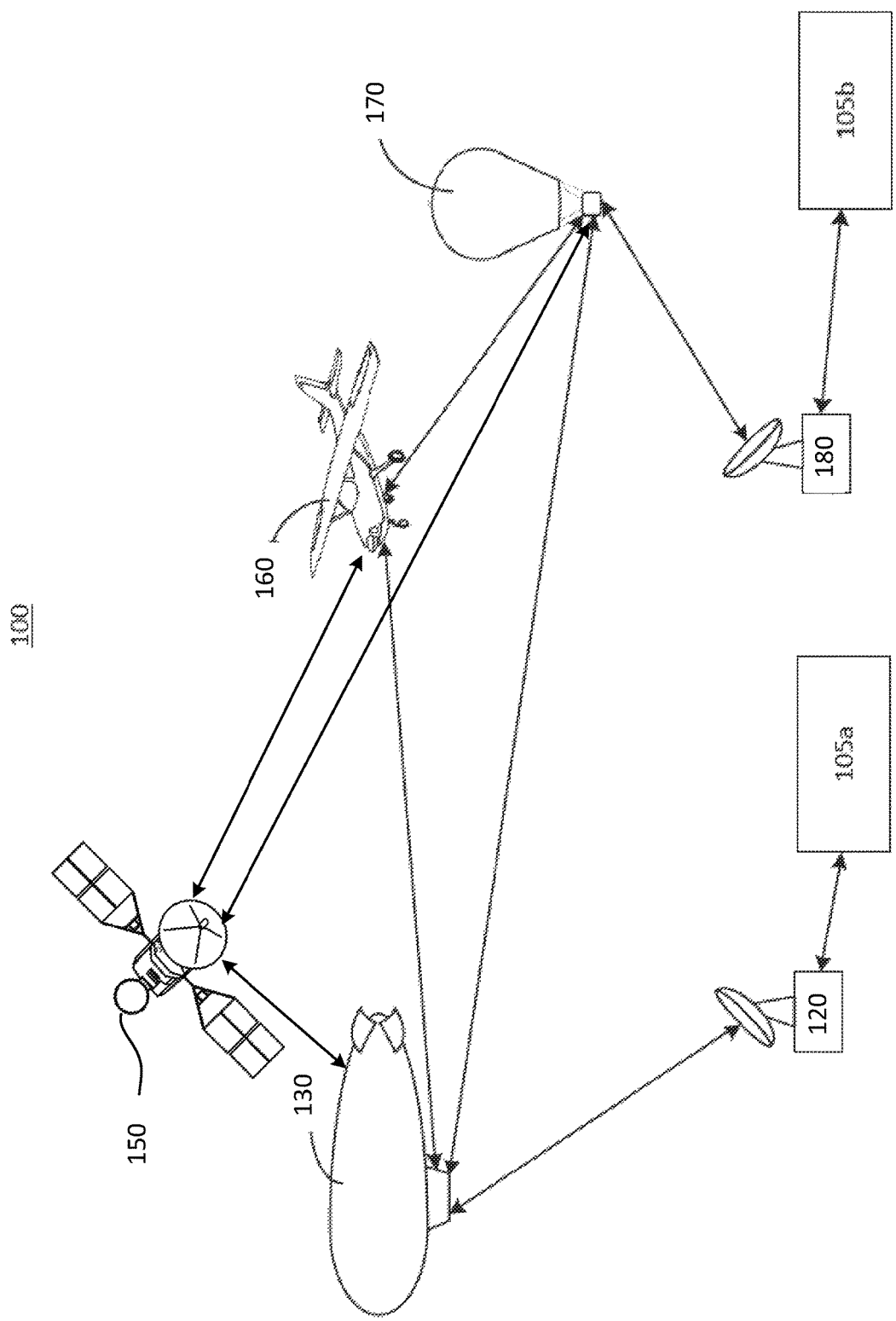
FIG. 1B is a pictorial diagram of the example directional point-to-point network 100 in accordance with aspects of the disclosure.

The technology relates to a network, such as network 100 depicted in FIGS. 1A and 1B, that implements optical switching and optical-electrical-optical conversions. One or more nodes of the network may be high-altitude platform (HAP) stations such as, for example, balloons, blimps, airplanes, unmanned aerial vehicles (UAVs), satellites, or any other form of high altitude platform. For example, stations 120 and 150 may be ground stations, and stations 130, 150, 170 may be HAP stations. Each of these stations may include one or more FSOC terminals that allow each station to send and receive optical signals. The stations may be configured for optical circuit switching (OCS) and for optical-electrical-optical conversions (OEO). Each of the HAP stations 130, 150, 170 may be configured for OCS with one or more other HAP stations, e.g., a horizontal or peer to peer link, or with links between a HAP station and a ground station, i.e., a vertical link. In addition, the HAP stations 130, 150, 170 may be equipped for OEO via such vertical links.

As shown in FIG. 1A and discussed further below, a central control system 110 in communication with a plurality of stations in the network 100, such as stations 120, 130, 150, 170, 180, may pre-determine or pre-plan a configuration of the network 100 including one or more paths through network 100 at block 112. The one or more paths may be determined at least based on received data regarding conditions at or near the plurality of stations. One example of a determined path may be a first determined path that starts at ground station 120, passes through each of HAP stations 130, 150, 170, and ends at ground station 180. Each determined path may be assigned a wavelength or set of wavelengths, such as a first wavelength for the first determined path. At block 114, path instructions may be transmitted from the central control system 110 to the plurality of stations, such as stations 120, 130, 150, 170, 180, to assume the determined configuration and/or schedule a series of configurations. Each of the plurality of stations may receive the path instructions from the central control system 110, as shown in blocks 122, 132, 152, 172, 182 with respect to stations 120, 130, 150, 170, 180, respectively.

Client data may be transmitted from a start station to a destination station via intermediate (first, second, third, etc.) stations in the network 100. For example, client data may be received at ground station 120 from a local network at block 124, and may be transmitted from ground station 120 to HAP station 130 via an optical signal in accordance with the first determined path at block 126. HAP station 130 may receive the optical signal from ground station 120 at block 134 and may perform OEO on the received optical signal at block 136. OEO may include converting the received optical signal to an electrical signal, processing the electrical signal to amplify, correct, buffer, and/or otherwise modulate the signal, and reconstruct an optical signal from the processed electrical signal using the first wavelength assigned to the first determined path. At block 138, HAP station 130 may then transmit the optical signal to HAP station 150, the next hop according to the first determined path. HAP station 150 may receive the optical signal from HAP station 130 at block 154 and may route the optical signal to the HAP station 170 using OCS at block 156 according to the first determined path. HAP station 170 may receive the optical signal from HAP station 150 at block 174 and perform OEO at block 176 before sending a reconstructed optical signal carrying the client data to ground station 180 at block 178. At ground station 180, the optical signal may be received from HAP station 170 at block 184. The client data may then be transmitted from ground station 180 via a local network using any type of signal at block 186.

Example Systems

As noted above, a network may include nodes at various land- and air-based stations, as shown in FIG. 1B. For instance, network 100 may include one or more ground stations 120 and 180 as well as one or more HAP stations 130, 150, 160, 170. HAP stations may include blimps, such as HAP station 130, satellites, such as HAP station 150, airplanes, such as HAP station 160, and balloons, such as HAP station 170. The one or more ground stations 120 and 180 are associated with one or more datacenters 105a and 105b, respectively. Each station may be configured for FSOC. Arrows shown between a pair of stations represent possible communication links between the pair of stations, such as, for example, optical links for FSOC.

It should be understood that the network 100 as shown in FIG. 1B is illustrative only, and in some implementations the network 100 may include additional or different stations. For example, in some implementations, the network 100 may include additional HAP stations. In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network.

Figure 2A:
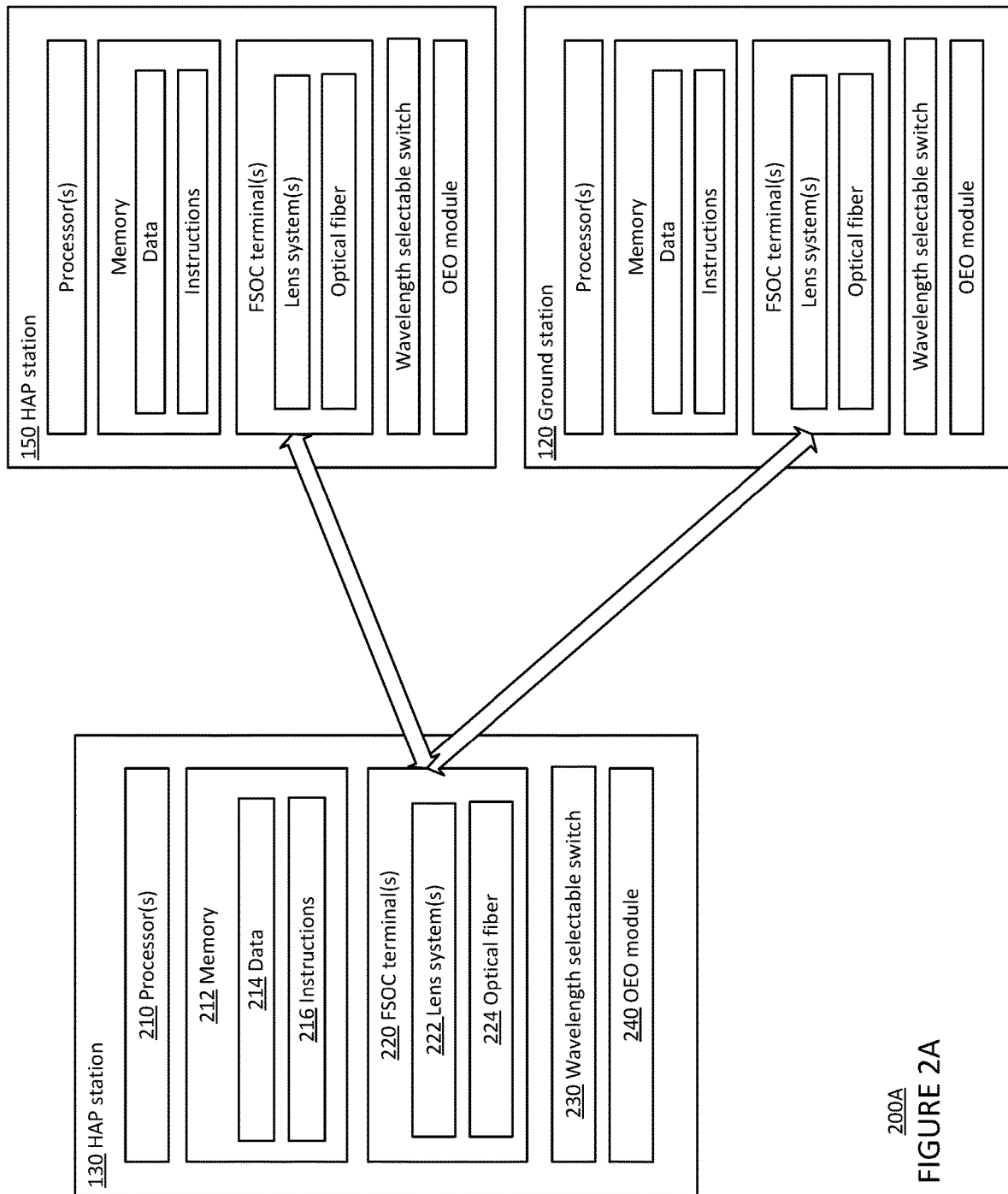
FIG. 2A is a functional diagram of a portion 200A of the network 100 shown in FIG. 1B in accordance with aspects of the disclosure.
Figure 2B:
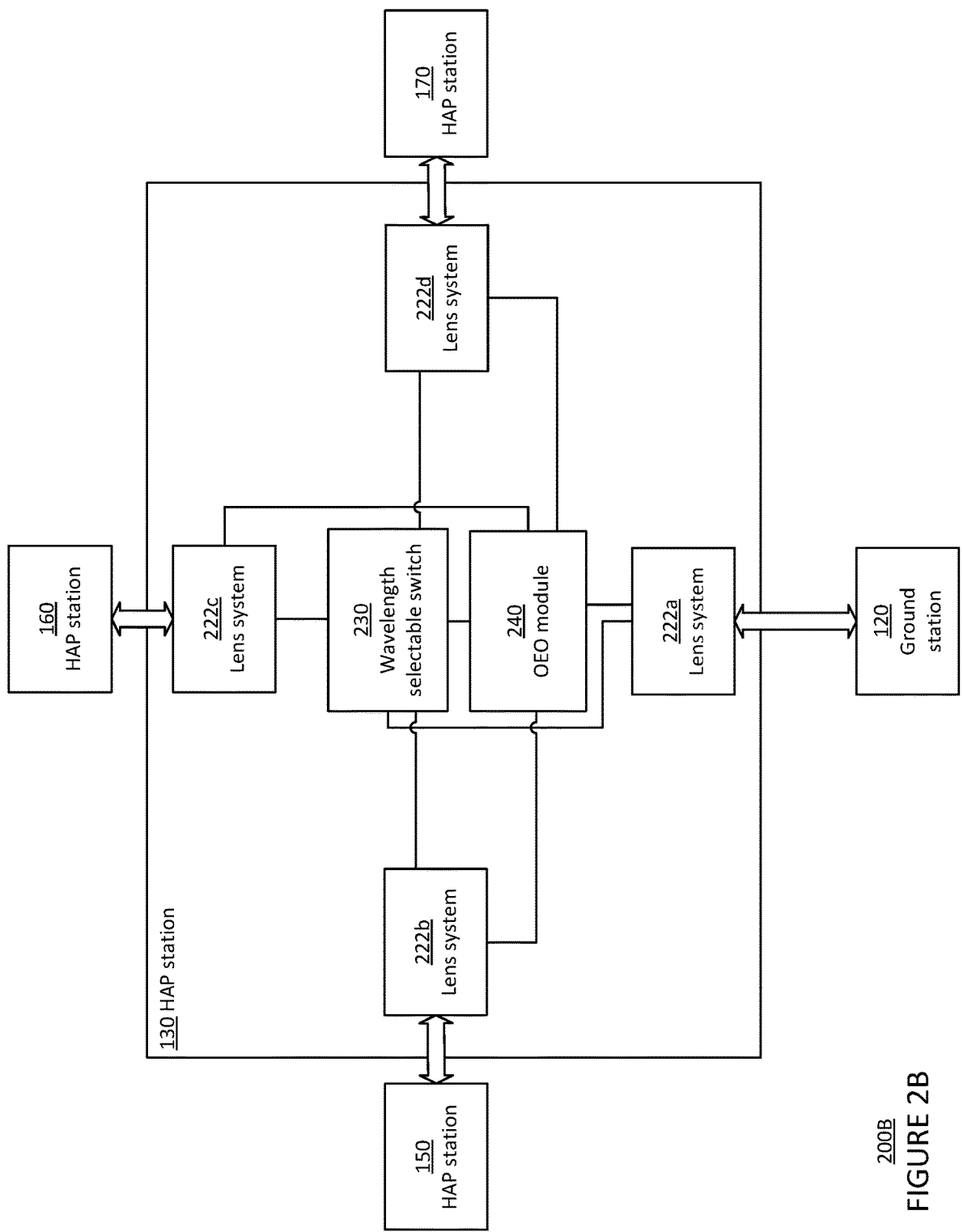
FIG. 2B is a functional diagram of another portion 200B of the network 100 shown in FIG. 1B in accordance with aspects of the disclosure.
Figure 3:
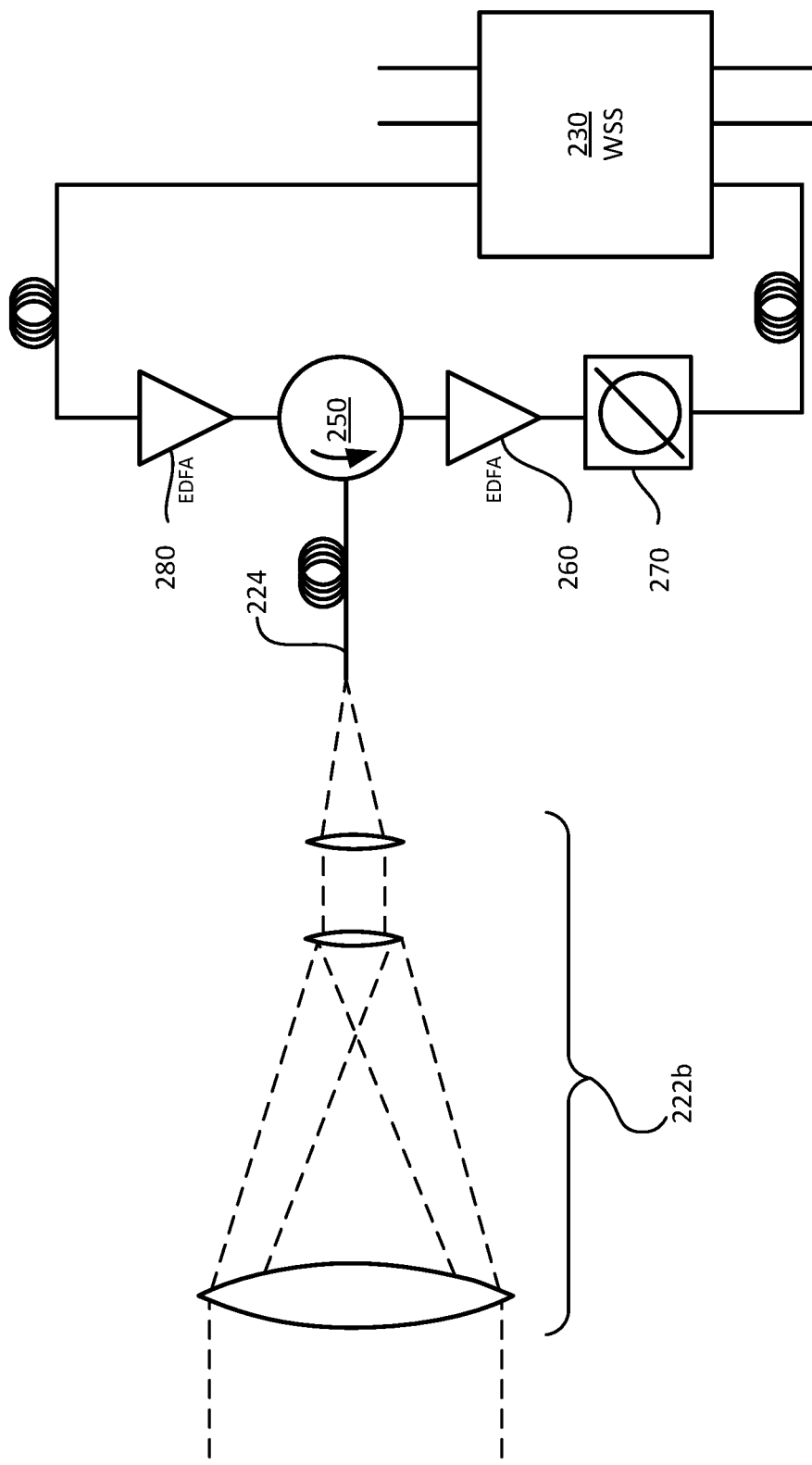
FIG. 3 is a circuit diagram 300 of an example station in the network 100 in accordance with aspects of the disclosure.

As shown in FIGS. 2A-2B and 3, a station in the network may be configured to perform optical circuit switching and communicate with other stations of the network 100. In FIG. 2A, only three stations are depicted for simplicity and ease of understanding. Referring to HAP station 130 as a reference, each of the stations, such as stations 120, 130, 150, 160, 170, 180 of network 100, may include one or more processors 210, a memory 212, one or more FSOC terminals 220, and a wavelength selectable switch (WSS) 230. Although the following description relates to the features of HAP station 130, it will be appreciated that each of the stations of the network 100 may have the same or similar configurations of features.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2A functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214 and instructions 216 that may be executed by the one or more processors 210. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

Instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

Each FSOC terminal 220 may include one or more lens systems 222, and an optical fiber 224. Each of the one or more lens systems 222 may include lenses that are in a fixed position with respect to one another and a steering mechanism. The steering mechanism may be one or more mirrors that steer an optical signal through the fixed lenses and/or a gimbal configured to move the fixed lenses with respect to the station. Using the steering mechanism, each of the one or more lens systems 222 may be pointed in a given direction, or a pointing direction, to receive an optical signal coming from the given direction. In other words, each lens system may have a pointing direction different from the other of the one or more lens systems 222.

Referring to FIG. 2B, for example, one or more lens system 222 of HAP station 130 may include lens systems 222a-d. In FIG. 2B, only five stations are depicted for simplicity and ease of understanding. In the depicted configuration of network 100, a first lens system 222a may have a first pointing direction towards a lens system of ground station 120 to form a communication link; a second lens system 222b may have a second pointing direction towards a lens system of HAP station 150 to form a communication link; a third lens system 222c may have a third pointing direction towards a lens system of HAP station 160 to form a communication link; and a fourth lens system 222d may have a fourth pointing direction towards a lens system of HAP station 170 to form a communication link. Lines shown in FIG. 2B connecting lens systems 222a-d, wavelength selectable switch 230, and OEO module 240 represent connections on which optical or electrical signals may travel within HAP station 130. FIG. 2B is illustrative only, and implementations of HAP station 130 (and/or the other stations of network 100) may include other connections or components not depicted in FIG. 2B.

Returning to FIG. 2A, each of the one or more lens systems 222 may be configured to receive an optical signal and focus it on an optical fiber. Optical fiber 224 may be configured to carry an optical signal received at one or more lens systems 222 to a wavelength selectable switch 230 for OCS. Referring to FIG. 2B, the received signal may be a combination of signals, such as, for example, a combination of a first optical signal received from the second lens system 222b and a second optical signal received from the third lens system 222c of one or more lens systems 222.

The one or more processors 210 of HAP station 130 may be configured to control the pointing directions of one or more lens systems 222, and the operation of WSS 230. For instance, the one or more processors 210 may cause the first lens system 222a of one or more lens systems 222 to change from pointing at a lens system of ground station 120 to pointing to a lens system of ground station 180. A pointing direction of a given lens system may also be changed based on relative movement of another station, or track the other station, in order to maintain a communication link between two stations.

In FIG. 3, an example functional diagram of features of station such as any of stations 120, 130 150, 160, 170, 180 is depicted. For HAP station 130, for example, an optical signal may be received at one or more lens systems 222, such as second lens system 222b, and coupled into an optical fiber 224, such as, for example, a single-mode optical fiber. The received optical signal may then be directed to WSS 230. At WSS 230, the received optical signal is input through a common port of WSS 230 and output from a plurality of output ports of WSS 230. Each output port may be connected to a unique lens system in the one or more lens systems 222. Two ports of WSS 230 are depicted as being connected to the second lens system 222b to receive a signal from the second lens system 222b and also to transmit a signal from the one or more lens systems 222b. Other output ports, shown as lines extending from WSS 230, may be coupled with other lens systems, such as lens system 222a, 222c, or 222d, in a same or similar way. In some embodiments, the optical signal may be received at the second lens system 222b of one or more lens systems 222, routed through WSS 230, and output via third lens system 222c of one or more lens systems 222 different from the second lens system. Moreover, the received optical signal may be split into one or more portions and output via different lens systems of one or more lens systems 222.

Different wavelengths of the received optical signal may be assigned to different output ports independent from one another. For example, the received optical signal may comprise a first optical signal portion having wavelength Xi and a second optical signal portion having wavelength $\lambda_2$. The first optical signal portion of the received optical signal may be assigned to a first output port of the WSS 230. The second optical signal portion of the received optical signal may be assigned to the first output port of the WSS 230 or a second output port of the WSS 230. Port assignments may be received from the one or more processors 210, and may be changed according to instructions received from the one or more processors 210. From the WSS 230, the first and second optical signal portions may be routed to one or more lens systems 222 for transmission. Alternatively, different sets of wavelengths, rather than a single wavelength, may be assigned to different output ports of the WSS 230.

In some implementations, WSS 230 may assign different optical signal portions of more than one received optical signal simultaneously. For example, the first optical signal received at the second lens system 222b of one or more lens systems 222 may comprise a first optical signal portion having wavelength Xi and a second optical signal portion having wavelength $\lambda_2$. The second optical signal received at the third lens system 222c of one or more lens systems 222 may comprise a third optical signal portion having wavelength $\lambda_2$ and a fourth optical signal portion having wavelength $\lambda_3$. At the WSS 230, the first optical signal and the second optical signal are received at the common port. The first optical signal portion may be output from the first output port; the second optical signal portion and the third optical signal portion may be output from the second output port; and the fourth optical signal portion may be output from a third output port. Optical signal portions having the same wavelength, such as the second and third optical signal portions, may be combined and transmitted via the assigned output port. Optionally, a fiber spool may be used to delay multiple optical signals or signal portions to align each of the multiple signals with time division multiple access (TDMA) frames so that the multiple signals may be transmitted on the same link.

Each of the stations 120, 130, 150, 160, 170, 180 may additionally or alternatively include one or more fiber switches that multiplexes the first optical signal and the second optical signal together before the multiplexed signal enters WSS 230. Another option is for one or more fiber switches to be included in HAP station 130 to multiplex the output optical signals having a same destination location before transmitting the output optical signal to a second station, such as, for example, HAP station 150.

As further shown in FIG. 3, in some embodiments, a station, such as any of stations 120, 130, 150, 160, 170, 180, may further include a circulator 250, a receive amplifier 260, an optical attenuator 270, and/or a send amplifier 280. The circulator 250 may have three ports: port 1 for receiving and transmitting optical signals via the lens system 222, port 2 for directing received optical signals towards the WSS 230, and port 3 for receiving optical signals from the WSS 230 to be transmitted via the lens system 222. The receive amplifier 260 may be positioned between port 2 of the circulator 250 and the WSS 230 and may boost the power of the received optical signals. Further, the optical attenuator 270 may be positioned between the receive amplifier 260 and the WSS 230 and may output optical signals having a constant power irrespective of any fluctuations in the power of the received optical signals. The send amplifier 280 may be positioned between an output port of the WSS 230 and port 3 of the circulator 250 and may boost the power of the optical signal portion transmitted from the output port of the WSS 230 to a requisite level.

In some implementations, each FSOC terminal of a station may have a circulator, a receive amplifier, an optical attenuator, and/or a send amplifier in the manner described above with respect to the circulator 250, receive amplifier 260, optical attenuator 270, and send amplifier 280. Stations with more than one FSOC terminal may therefore have more than one circulator, more than one receive amplifier, more than one optical attenuator, and/or more than one send amplifier.

Returning to FIG. 2A, the optical fiber 224 may also be configured to carry a received optical signal to OEO module 240 for OEO conversion that includes additional processing of the electrical signal. In particular, a first station, for example, HAP station 130, may be configured to perform OEO before transmitting an optical signal on a link between HAP station 130 and a destination station, such as, for example, ground station 120. The one or more processors 210 may be configured to receive an optical signal received via the lens system 222, convert the received optical signal to an electrical signal using OEO module 240, and reconstruct an optical signal from the electrical signal to be transmitted to another station, such as, for example, ground station 120 or HAP station 150. The reconstructed optical signal may be transmitted via the WSS 230.

The electrical signal may be processed before the optical signal is reconstructed from the electrical signal. For example, the one or more processors 210 at HAP station 130 may perform one or more types of signal processing such as, for example, error/fade detection and correction, signal reconstruction, buffering, interleaving, or alternate modulation schemes. In some embodiments, the electrical signal may be processed to interleave multiple signals received from one or more links so that, when the electrical signal is converted to an optical signal for output, the multiple signals may be transmitted optically together over the same link and optionally, the same wavelength.

Figure 4:
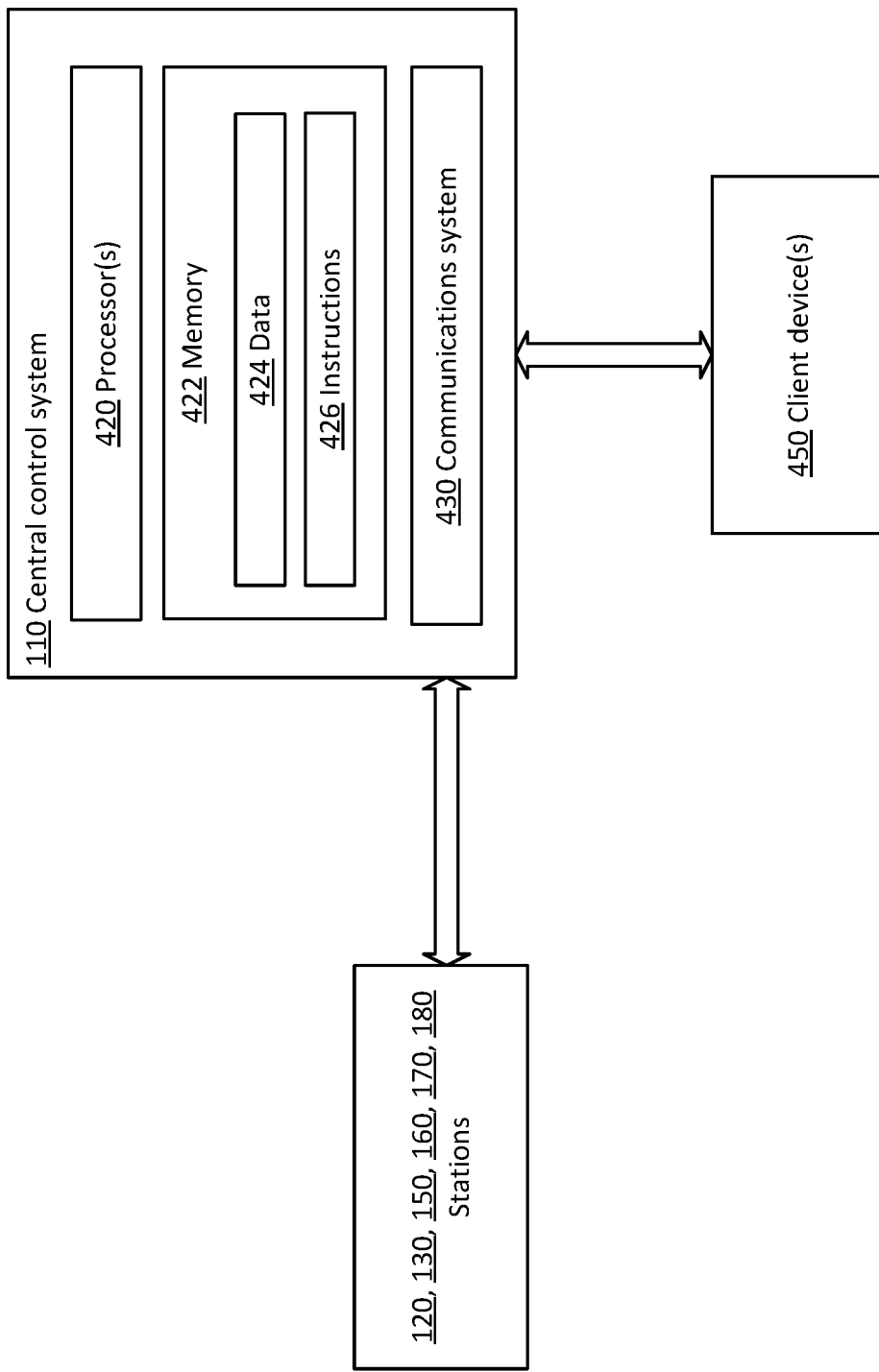
FIG. 4 is a functional diagram 400 of an example central control system in accordance with aspects of the disclosure.

As shown in FIG. 4, the network 100 may also include a central control system 110 that is configured to determine a path of each wavelength of light in OCS between a start station and a destination station via FSOC terminals in the network 100. The central control system 110 may comprise one or more processors 420, memory 422 and a communication system 430. The one or more processors 420 may be any well-known processor or a dedicated controller similar to the one or more processors 210 described above. Memory 422 may store information accessible by the one or more processors 420, including data 424 and instructions 426 that may be executed by processor 420. Memory 422, data 424, and instructions 426 may be configured similarly to memory 212, data 214, and instructions 216 described above. The communications system is configured to communicate with the stations 120, 130, 150, 160, 170, 180 of network 100. The communication system 430 may be configured to transmit a signal directly to each of the stations 120, 130, 150, 160, 170, 180 on one or more links separate from links between the stations. The one or more links between the communication system 430 and each of the stations 120, 130, 150, 160, 170, 180 may be formed via optical fiber, radio frequencies, optical frequencies, cable, or other communication means to one or more stations in the network 100. The central control system 110 may be located at a datacenter, a ground station, a HAP station, or at another separate platform within network 100.

Central control system 110 may be capable of directly and indirectly communicating with one or more client devices 450 using communication system 430. Communications with client devices 450 may be for the purpose of receiving, processing and transmitting data to the client devices. For example, data related to client demand, such as amount of client data to be transmitted and a timing for transmission, may be received, and data regarding available paths between ground stations through network 100 may be transmitted. Each client device may be a personal computing devices or a server with a processor, memory, data, and instructions similar to those described above with respect to the one or more processors 210 and 420. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices in accordance with the systems and methods described herein may comprise any device capable of processing instructions and transmitting data to and from humans and other computers including general purpose computers, network computers lacking local storage capability, and set-top boxes for televisions.

In an alternative embodiment, one or more stations in network 100, such as any of stations 120, 130 150, 160, 170, 180, may further be configured to transmit and receive electrical signals or other electromagnetic waves through the network 100 in addition to FSOC signals. For transmission, the electrical signal obtained through optical-electrical conversion may be transmitted electrically or in a waveform outside of the optical communications electromagnetic spectrum, or a non-optical wave, such as, for example, radio-frequency (RF) waves or millimeter (MM) waves. On the receive side, the station may be configured to convert the received signal to an output optical signal, and transmit the output optical signal to yet another station in the network. The output optical signal may have a particular wavelength depending on the desired destination, location of stations, movement of stations, weather conditions, and other factors.

Example Methods

In FIGS. 5-8, flow diagrams 500, 600, 700, and 800 are shown in accordance with some of the aspects described above that may be performed by the one or more processors 420 of the central control system 110 or the one or more processors of the stations, such as the one or more processors 210 of HAP station 130. While FIGS. 5-8 show blocks in a particular order, the order may be varied and that multiple operations may be performed simultaneously. Also, operations may be added or omitted.

Figure 5:
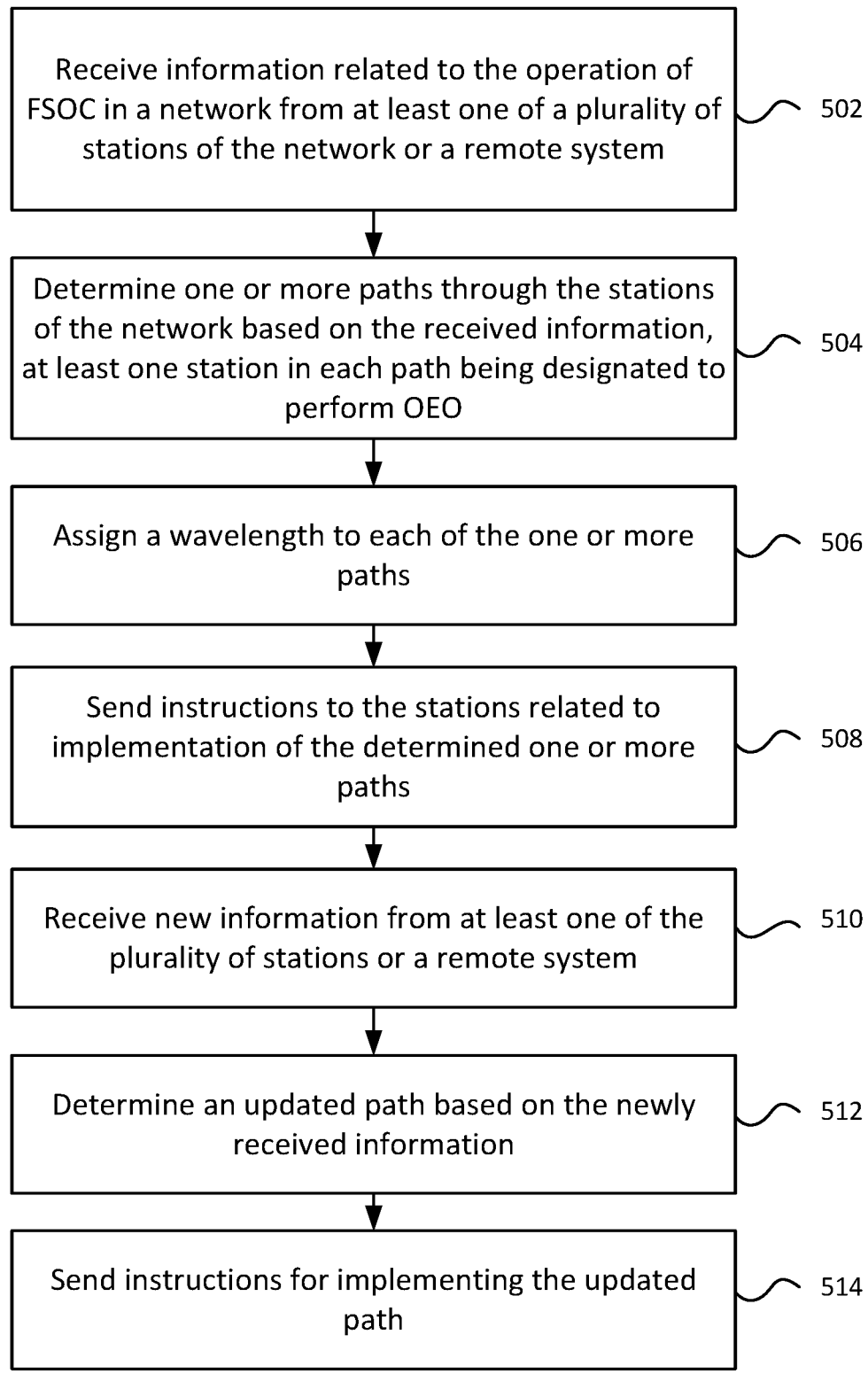
FIG. 5 is a flow diagram 500 of an example method in accordance with aspects of the disclosure.

Turning to FIG. 5, one or more processors of a central control system, such as the one or more processors 420 of central control system 110, may pre-determine or pre-plan paths for FSOC in an optical network, such as network 100, and may further provide updates to the pre-determined paths based on received data. Pre-determination, or pre-planning, of paths occurs before signals are sent across the network 100 on the pre-determined paths, and may include determining a schedule for a series of path configurations. At block 502, the one or more processors 420 may receive information related to the operation of FSOC in network 100 from one or more stations of the network 100 or a remote system. Received information may be related to conditions at a location of each station or in regions between pairs of stations. Received information may also include available system resources at each station, demand at each station or from a client device, predicted or measured duration and characteristics of fades and latency at each station, traffic rates in network 100, and pricing information of paths. For example, information regarding location, trajectory, traffic rates, predicted or measured duration and characteristics of fades, and/or latency of each station may be received from stations in network 100; weather data and forecasts may be received from a station a station or a remote weather monitoring and forecasting system; client demand may be received from a client device; or pricing information of paths may be received from a remote server.

At block 504, one or more paths through the stations of network 100 may be determined based on the received information. Each path may start at a start station and end at a destination station. Both start and destination stations may be ground stations. In addition, each path may include at least one station designated to perform OEO, for instance in order to allow the station to amplify, correct, buffer, and/or otherwise modulate the signal, and all other stations in the path designated to perform OCS. A station linked with the start station or the destination station in a path may be designated to perform OEO. In other examples, a HAP station linked with a ground station in a path may be designated to perform OEO.

For example, a first determined path may comprise a first link between stations 120 and 130, a second link between stations 130 and 150, a third link between stations 150 and 170, and a fourth link between stations 170 and 180. In this example, ground station 120 is the start station, and ground station 180 is the destination station. The one or more processors 420 may determine that a link between stations 130 and 160 is unfeasible because, for instance, HAP station 160 has flown out of range of (i.e., too far from) HAP station 130 or alternatively atmospheric or weather conditions between the HAP stations 130 and 160 are unfavorable for the link (e.g., link will not close, latency or error rate too high). Unfavorable atmospheric or weather conditions may include turbulence, clouds, or pollution. HAP station 130, being linked with a ground station which is also the start station of the first determined path, may be designated to perform OEO. The signal received from ground station 120 may therefore be processed before being transmitted through network 100. Additionally or alternatively, HAP station 170, being linked with a ground station which is also the destination station of the first determined path, may be designated to perform OEO. As such, the signal received from HAP station 150 may also be processed before being transmitted to ground station 180.

At block 506, each determined path may be assigned a wavelength or set of wavelengths of the available wavelengths of light by the central control system. A first wavelength may be assigned to the first determined path. In some embodiments, a different wavelength may be assigned for vertical links between a HAP station and a ground station when OEO is being performed at the HAP station. In this example, a second wavelength may be assigned to vertical links between HAP station 130 and ground station 120 and between HAP station 170 and ground station 180.

At block 508, instructions may be sent to one or more stations related to implementation of the determined one or more paths, such as, for example, a pointing direction for the one or more lens systems and/or port assignments for the WSS of each station. Instructions may be sent to the one or more stations via optical fiber, radio frequencies, optical frequencies, cable, or any other communication means. Instructions for the one or more processors of the stations of the network 100 to implement the first determined path may be sent via communication system 430 by the one or more processors 420. Such instructions may include pointing directions for one or more lens systems of each station and port assignments for one or more WSS, and may also include a timing or a schedule for use of the determined one or more paths.

Because HAP station 130 is linked with both ground station 120 and HAP station 150 in the first determined path, instructions sent to the one or more processors 210 may include a first pointing direction for the first lens system 222a in one or more lens systems 222, and a second pointing direction for a second lens system 222b in one or more lens systems 222. The first pointing direction may align the first lens system 222a with a lens system of ground station 120 to allow the FSOC terminals of HAP station 130 and ground station 120 to mutually send and receive optical signals, and the second pointing direction may align the second lens system 222b with a lens system of HAP station 150 to allow the FSOC terminals of HAP stations 130 and 150 to mutually send and receive optical signals. In addition, the instructions sent to one or more processors 210 may also include an indication to be stored as data 214 in memory 212 that the received signals of the first wavelength are to be transmitted to HAP station 150. Because HAP station 150 is linked between HAP station 130 and HAP station 170 in the first determined path, the instructions sent to the one or more processors of HAP station 150 may include pointing directions for the one or more lens systems of HAP station 150 facing toward HAP stations 130 and 170. Furthermore, because HAP station 150 is designated to perform OCS in the first determined path, the instructions may include port assignments for the WSS of HAP station 150 that route signals having the first wavelength to an output port associated with the lens system pointed at HAP station 170. In some implementations, the instructions may include a window of time for which the first determined path is scheduled, such as, for example, from 8:55 am GMT to 9:00 am GMT. Therefore, the one or more processors of the stations may be instructed to change according to the first determined path when the window of time begins.

At block 510, the one or more processors 420 may receive new information from the one or more stations or a remote system, and, at block 512, an updated path may be determined based on the newly received information. For instance, at some point in time after determining the one or more paths, based on newly received information related to the operation of FSOC in the network 100, the one or more processors 420 may determine an updated path for the first wavelength. For example, a new weather forecast may indicate that a weather system will be in the path of the link between HAP stations 130 and 150 at 9:00 am GMT. The one or more processors 420 may receive the forecast of the weather system and determine a new path for the first wavelength using the link between HAP stations 130 and 160. Instructions may be sent to HAP station 130 to switch from transmitting the first wavelength to HAP station 150 to transmitting the first wavelength to HAP station 160 at 9:00 am GMT. In another example, the new information may include an indication of an outage at HAP station 150 such that optical signals are not reaching or are not received from HAP station 150. The one or more processors 420 may, in response, send instructions to HAP station 130 to immediately switch from transmitting to HAP station 150 to transmitting to HAP station 160. In some embodiments, an update may be performed regularly, such as about every five (5) minutes, every 24 hours, or more or less often.

At block 514, the one or more processors 420 may send updated instructions to the stations for implementing the updated path. Instructions may include an updated pointing direction for one or more lens systems and/or updated port assignments for one or more WSS. In this example, the second lens system of one or more lens systems 222 of HAP station 130 may be instructed to move to a new pointing direction directly facing a lens system of HAP station 160. As described above at block 508, instructions may also include a timing or schedule for the updated path, and may be sent via communications system 430.

Figure 6:
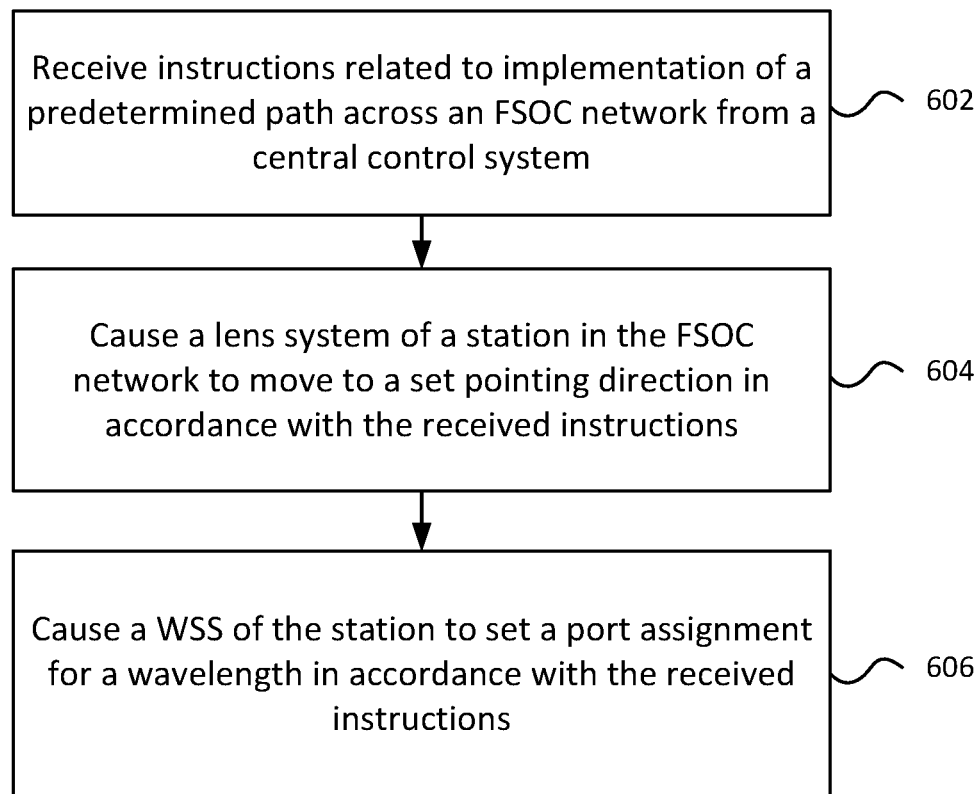
FIG. 6 is a flow diagram 600 of another example method in accordance with aspects of the disclosure.

In FIG. 6, one or more processors of the stations of network 100, such as the one or more processors 210 of HAP station 130, may control one or more lens systems 222 and/or a WSS 230 according to path instructions from the central control system 110. The one or more processors 210 may make changes to the one or more lens systems 222 or the WSS 230 of HAP station 130 to implement one or more paths determined by the central control system in response to receiving the path instructions. Determined paths may include those that are determined by one or more processors 420 of central control system 110 at block 504 of flow diagram 500. Other stations in the network, such as stations 120, 150, 160, 170, 180, may perform these or other steps according to the path instructions from the central control system 110 in order to implement the one or more paths.

At block 602, the one or more processors 210 of HAP station 130 may receive instructions related to implementation of predetermined paths on network 100 from the one or more processors 420 of central control system 110. The determined paths may include the first determined path from block 504, and the instructions may include the instructions from central control system 110 (see, for instance, block 508 of FIG. 5). In some implementations, the received instructions may include the time or the schedule for using one or more determined paths, and the one or more processors 210 may determine that a time is reached to implement a particular determined path.

At block 604, the one or more processors 210 may cause one or more lens systems of one or more stations to move to a pointing direction in accordance with the received instructions. According to the instructions described in block 508, for example, the first lens system 222*a* of one or more lens systems 222 may be moved to a pointing direction directly facing a lens system of ground station 120, and the second lens system 222*b* of one or more lens systems 222 may be moved to a pointing direction directly facing a lens system of HAP station 150.

At block 606, the one or more processors 210 may additionally or alternatively cause one or more WSS to change a port assignment for a wavelength in accordance with the received instructions at block 606. Further according to the instructions described in block 508, the WSS of HAP station 150 may assign the first wavelength to an output port associated with the lens system pointed at HAP station 170.

Figure 7:
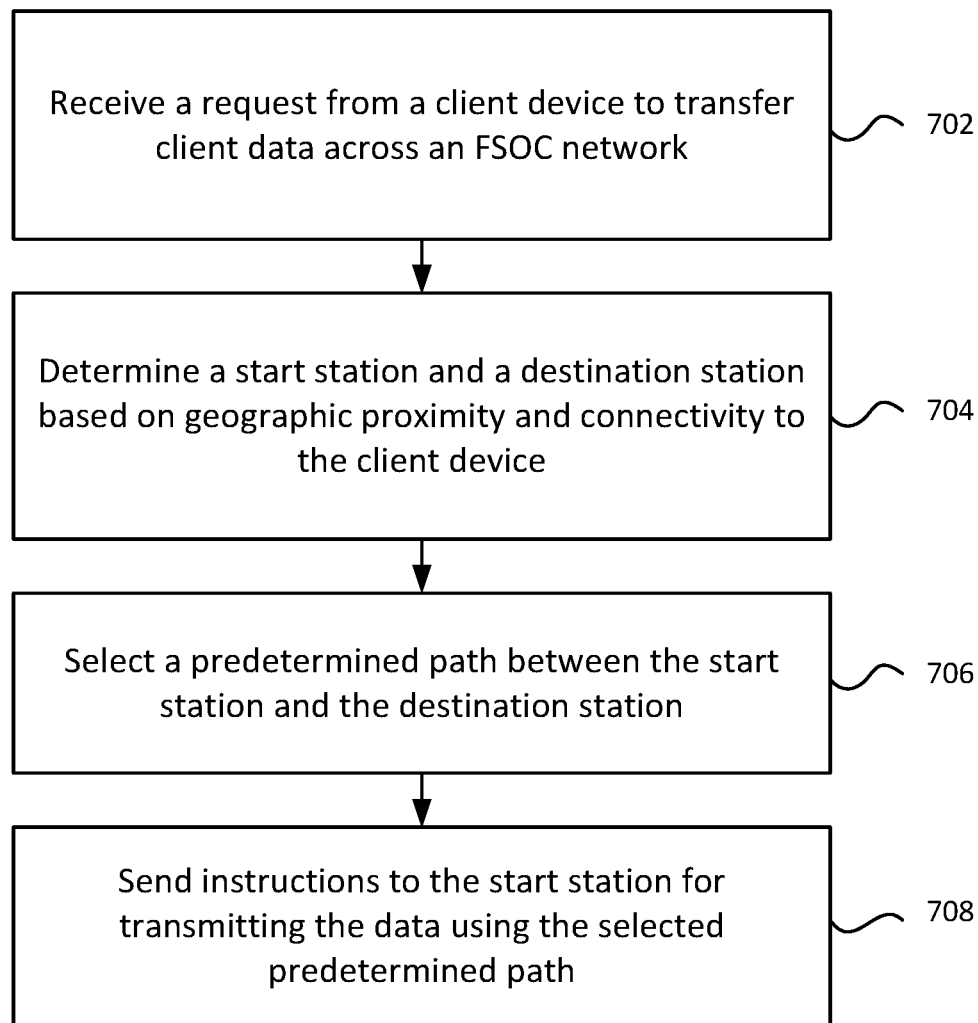
FIG. 7 is a flow diagram 700 of a further example method in accordance with aspects of the disclosure.

In FIG. 7, one or more processors of a central control system, such as the one or more processors 420, may arrange for client data to be sent from a start station to a destination station via an optical network, such as network 100. At block 702, the one or more processors 420 may receive a request from a client device to transfer client data across the network 100 at block 702. The request may include information regarding the amount of data and timing for the transfer.

At block 704, a ground station 120 may be identified as the start station, and ground station 180 may be identified as the destination station based on geographic proximity and connectivity to the client device and the information in the client request.

At block 706, the one or more processors 420 may determine a path between the start station and the destination station, which in this example is ground station 120 and ground station 180, respectively. The determination of the path may be selecting a path from a list of predetermined paths, such as the one or more paths determined by the one or more processors 420 at block 504 of flow diagram 500. For the path between ground stations 120 and 180, the first determined path described in block 504 may be selected for the client request. Alternatively, a real-time determination may be based on locations of the stations, movement of the stations, conditions related to FSOC at or between stations, available system resources at each station, demand at each station or from a client device, predicted or measured duration and characteristics of fades and latency at each station, traffic rates in network 100, and pricing information of paths, and/or other variables.

At block 708, the one or more processors 420 may send instructions to the start station and/or the client device for transmitting the data using the determined path. The instructions may include an indication of the first determined path on which the client data is to travel. The instructions may optionally include a timing, or schedule, for the transmission of the client data.

In some examples, a response may be sent to the client device indicating availability of the path and/or a price for transmission of the data using the path, and the instructions for transmitting the data may be sent after receiving a confirmation from the client device. In addition or alternatively, the one or more processors 420 may send a message to one or more client device indicating availability of a determined path between the start station and the destination station. A response from one of the one or more client devices may be received that includes a request to use the determined path for transmitting client data. In response to receiving the response, the one or more processors 420 may send instructions to the start station to initiate transmission of the data using the determined path.

Figure 8:
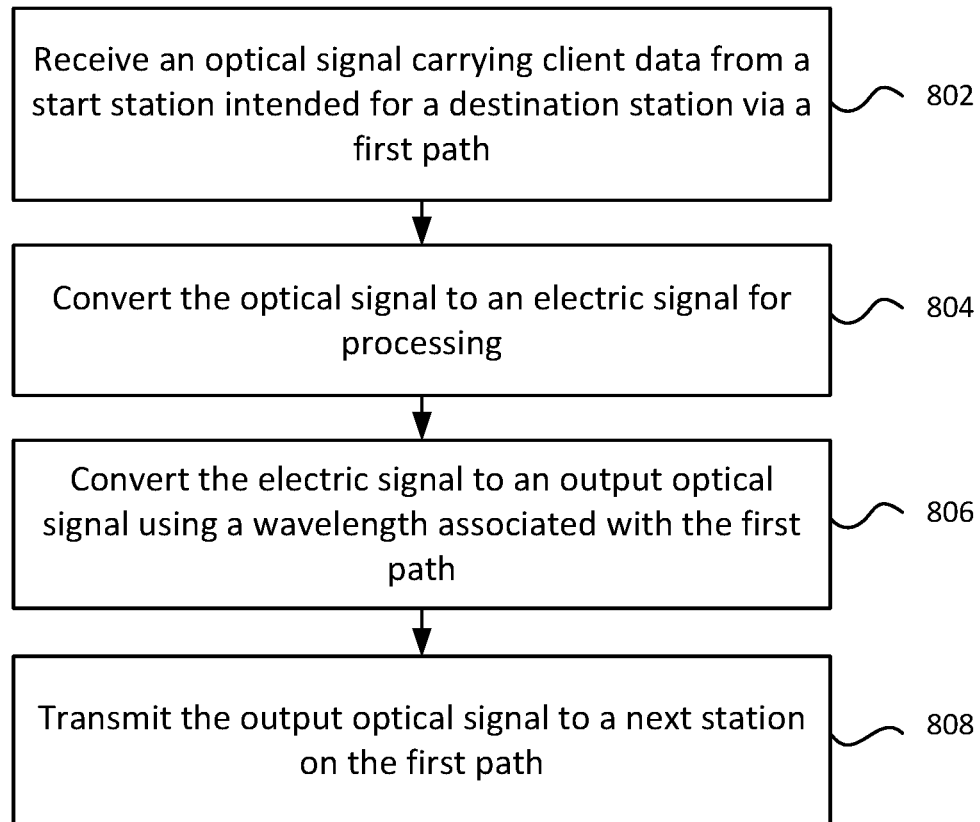
FIG. 8 is a flow diagram 800 of yet another example method in accordance with aspects of the disclosure.
Figure 9:
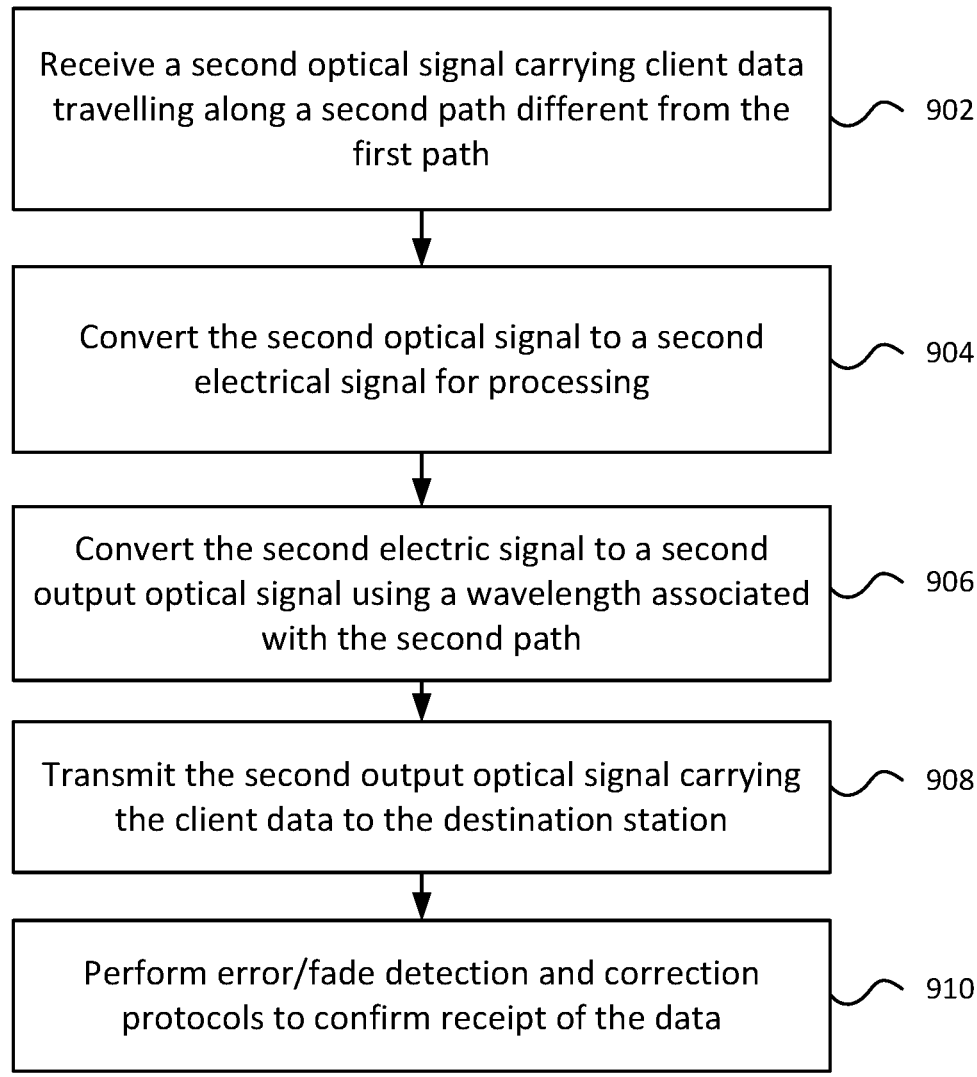
FIG. 9 is a flow diagram 900 of another example method in accordance with aspects of the disclosure.

In FIGS. 8 and 9, one or more processors of a station, such as the one or more processors 210 of HAP station 130, may perform OEO to transmit client data along a determined path through network 100. Other stations in the network, such as stations 120, 150, 160, 170, 180, may perform these or other steps according to the path instructions from the central control system 110 in order to implement the one or more paths.

In FIG. 8, at block 802, the one or more processors 210 of HAP station 130 may receive an optical signal carrying client data from ground station 120 intended for ground station 180. The path for the data may be previously determined by central control system 110, such as, for example, the selection of the first determined path for transmission of client data at block 706 of flow diagram 700, where the first determined path travels from ground station 120, through HAP stations 130, 150, and 170, to ground station 180. As described at block 504, HAP station 130 may be designated for OEO.

At block 804, the optical signal may be converted to an electrical signal using OEO module 240 of HAP station 130, and processed by one or more processors 210. The electrical signal may be processed at the OEO module to check that the client data was properly received from ground station 120 and prepare the client data for transmission to the next hop in the first determined path. Processing may include error/fade detection and correction protocols, signal reconstruction, amplification, and/or other modulation schemes.

At block 806, the electrical signal may be converted to an output optical signal. When converting the electrical signal back to an output optical signal, the one or more processors may use the first wavelength for the optical signal according to the wavelength assignment of the first determined path described at block 506. At block 808, the output optical signal having the first wavelength may be transmitted by the one or more processors 210 to HAP station 150 via the second lens system of lens system 222.

In FIG. 9, at block 902, a second optical signal carrying client data and travelling along a second determined path different from the first determined path may be received by the one or more processors 210 from HAP station 150. The second determined path may be pre-planned by the one or more processors 420 of central control system 110 as described above with respect to the first determined path, and may be the reverse of the first determined path. As such, the second determined path may start at ground station 180 as the start station, pass through HAP stations 170, 150, 130, and end at ground station 120 as the destination station.

At block 904, the second optical signal may be converted to an electrical signal by the one or more processors 210 using OEO module 240 and processed using signal modulation schemes discussed above. The electrical signal may be processed at the OEO module to check that the client data was properly received from HAP station 130 and prepare the client data for transmission to the destination station, ground station 120. At block 906, the second electrical signal may be converted to a second output optical signal according to a wavelength assignment of the second determined path. At block 908, the second output optical signal carrying the client data may be transmitted to ground station 120, the destination station for the second determined path. At block 910, the one or more processors 210 may perform error/fade detection and correction protocols with the one or more processors of ground station 120 to confirm receipt of the data.

In some embodiments, the station designated for OEO may additionally or alternatively be designated for optical-electrical or electrical-optical conversion. When the station is designated for optical-electrical conversion, the OEO module may be configured to convert the electrical signal derived from the received optical signal to a non-optical wave for transmission to the next hop, such as a destination station or a ground station. The non-optical wave may be, for example, RF waves or MM waves. As such, one or more processors of a station designated for OEO, such as one or more processors 210 of HAP station 130 may determine that the output optical signal and/or the client data is not being received by ground station 120. This determination may be based on receipt of a NACK response from one or more processors of ground station 120. After a set amount of time, one or more processors 210 may use a non-optical wave to transmit the client data. When the station is designated for electrical-optical conversion, the OEO module may be configured to derive an electrical signal from a received non-optical wave, process the electrical signal, and convert the electrical signal to an optical signal for transmission to the next hop, such as a next HAP station.

The features described above may provide for a reliable way for users to transmit data to different parts of the world. A communication network created using the features described may provide users with network coverage that is more robust to fade and outages because OEO allows for different modulation schemes not available for a purely optical system. Because of this, end users of the communication network are more likely to use the network because it may provide more reliable coverage. In addition, because of the lower power and weight requirements of FSOC terminals created using the features described, FSOC terminals may be mounted on types of HAPs that are mobile and easily set up in more remote areas. End users may therefore have increased accessibility to datacenters and other points of interest worldwide.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A station in a network, the station comprising:
a wavelength selectable switch configured to perform optical circuit switching (OCS) in the network, the wavelength selectable switch being configured to:
receive a first optical signal having a first designated wavelength and a second signal having the first designated wavelength; and
transmit a combination of the first signal and the second signal through an assigned output port to a first next hop;
an optical-electrical-optical (OEO) module configured to:
convert data from a third optical signal having a second designated wavelength to an electrical signal,
convert the electrical signal to a fourth optical signal, and
provide the fourth optical signal for transmitting to a second next hop; and
one or more processors configured to control the wavelength selectable switch and the OEO module, the one or more processors being configured to:
receive instructions related to implementation of a first predetermined path and a second predetermined path across the network, the received instructions including (i) a first designation of the station for performing OEO conversion for a first wavelength along the first predetermined path and (ii) a second designation of the station including a port assignment at the wavelength selectable switch for a second wavelength along the second predetermined path;
controlling, by the one or more processors, the wavelength selectable switch to designate the second wavelength as the first designated wavelength and the assigned output port according to the port assignment;
performing, using the OEO module, OEO conversion of an optical signal when the optical signal has the first wavelength; and
transmitting, by the one or more processors, an output optical signal resulting from the OEO conversion to a corresponding next hop along the first predetermined path.

2. The station of claim 1, wherein the one or more processors are further configured to process an electrical signal derived from the optical signal during OEO conversion by performing error/fade detection and correction.

3. The station of claim 1, wherein an output port of the wavelength selectable switch is connected to the OEO module.

4. The station of claim 1, further comprising a plurality of lens systems, each lens system being configured to point in a given direction independent from another lens system in the plurality of lens systems.

5. The station of claim 4, wherein the one or more processors are further configured to adjust a pointing direction of a lens system in the plurality of lens systems to form a link on the first predetermined path or the second predetermined path.

6. The station of claim 4, wherein each output port of the wavelength selectable switch is connected to a unique lens system in the plurality of lens systems.

7. The station of claim 4, wherein each of the plurality of lens systems is connected to a unique input port of the wavelength selectable switch.

8. The station of claim 4, wherein the OEO module is configured to output a signal to each of the plurality of lens systems.

9. The station of claim 4, further comprising a circulator including:
a first port configured to receive signals from a given lens system and direct signals to the given lens system;
a second port configured to direct the received signals to the wavelength selectable switch; and a third port configured to receive signals from the wavelength selectable switch to be output from the first port.

10. The station of claim 9, further comprising:
a receive amplifier positioned between the second port of the circulator and the wavelength selectable switch;
an optical attenuator positioned between the receive amplifier and the wavelength selectable switch; and
a send amplifier positioned between an output port of the wavelength selectable switch and the third port of the circulator.

11. The station of claim 1, wherein the wavelength selectable switch includes a fiber spool configured to combine the first optical signal and the second optical signal by aligning a portion of the first optical signal and a portion of the second optical signal with corresponding time division multiple access (TDMA) frames.

12. A method comprising:
receiving, by one or more processors of a station in a network, instructions related to implementation of a first predetermined path and a second predetermined path across the network, the received instructions including (ii) a first designation of the station for performing optical-electrical-optical (OEO) conversion for a first wavelength on a first link of the first predetermined path and (ii) a second designation of the station including a port assignment at a wavelength selectable switch of the station for a second wavelength for a second link of the second predetermined path;
controlling, by the one or more processors, the wavelength selectable switch of the station to designate the second wavelength for output from a given output port according to the port assignment, including configuring the wavelength selectable switch to direct a combination of a first optical signal and a second optical signal to be transmitted through the given output port to a first next hop on the second predetermined path when the first optical signal and the second optical signal have the second wavelength;
transmitting, by the one or more processors, the first optical signal or the second optical signal;
performing, by the one or more processors using an OEO module, OEO conversion of a third optical signal when the third optical signal has the first wavelength, the OEO conversion including:
converting data from the third optical signal to an electrical signal,
converting the electrical signal to a fourth optical signal, and
providing the fourth optical signal for transmitting to a second next hop on the first predetermined path; and
transmitting, by the one or more processors, the fourth optical signal.

13. The method of claim 12, wherein the performing the OEO conversion further includes processing the electrical signal converted from the third optical signal to perform error/fade detection and correction.

14. The method of claim 12, further comprising:
receiving the third optical signal at the wavelength selectable switch; and
directing, using the wavelength selectable switch, the third optical signal to the OEO module.

15. The method of claim 12, wherein the transmitting of the first optical signal is via a first lens system of the station, and the transmitting of the fourth optical signal is via a second lens system of the station.

16. The method of claim 15, further comprising adjusting a pointing direction of the first lens system to form a link with the first next hop on the second predetermined path.

17. The method of claim 15, further comprising adjusting a pointing direction of the second lens system to form a link with the second next hop on the first predetermined path.

18. The method of claim 12, further comprising:
receiving an optical signal at the station via a lens system;
amplifying, using a receive amplifier, the received optical signal;
adjusting, using an optical attenuator, a power of the received optical signal to a constant power; and
after the amplifying and the adjusting, receiving the optical signal at the wavelength selectable switch.

19. The method of claim 12, further comprising:
amplifying, using a send amplifier, the first optical signal prior to the transmitting of the first optical signal.

20. The method of claim 12, further comprising:
transmitting, by the one or more processors, a first data to a central control system regarding free-space optical communication conditions at the station;
receiving, by the one or more processors, updated instructions from the central control system based on the first data, the updated instructions including an updated pointing direction for the station or an updated port assignment for the wavelength selectable switch; and
controlling, by the one or more processors, the station or the wavelength selectable switch according to the received updated instructions.

* * * * *

UNITED STATES PATENT AND TRADEMARK OFFICE
CERTIFICATE OF CORRECTION

Page 1 of 1

PATENT NO. : 11,146,331 B1
APPLICATION NO. : 16/935412
DATED : October 12, 2021
INVENTOR(S) : Schubert et al.

It is certified that error appears in the above-identified patent and that said Letters Patent is hereby corrected as shown below:

In the Claims

Claim 1, Column 16, Line 2:
Now reads: "a second signal"; should read -- a second optical signal --

Claim 1, Column 16, Line 4:
Now reads: "the first signal"; should read -- the first optical signal --

Claim 1, Column 16, Lines 4 and 5:
Now reads: "the second signal"; should read -- the second optical signal --

Signed and Sealed this
First Day of March, 2022

Drew Hirshfeld
*Performing the Functions and Duties of the
Under Secretary of Commerce for Intellectual Property and
Director of the United States Patent and Trademark Office*